United States Patent [19]

Lorell et al.

[11] 4,012,018
[45] Mar. 15, 1977

[54] ALL SKY POINTING ATTITUDE CONTROL SYSTEM

[75] Inventors: Kenneth R. Lorell, Palo Alto; James P. Murphy, San Jose, both of Calif.

[73] Assignee: The United States of America as represented by the Administrator of the National Aeronautics and Space Administration, Washington, D.C.

[22] Filed: Oct. 4, 1973

[21] Appl. No.: 403,695

[52] U.S. Cl. .................... 244/165; 235/150.2; 235/150.25; 244/3.21; 244/171
[51] Int. Cl.² ........................................ B64G 1/10
[58] Field of Search ............. 244/15 A, 3.16, 3.18, 244/3.21, 77 SS, 165, 169, 171, 176; 250/203 R, 231 GY; 235/150.2, 150.25; 73/178 R

[56] References Cited

UNITED STATES PATENTS

| | | | |
|---|---|---|---|
| 2,974,594 | 3/1961 | Boehm | 244/169 |
| 3,263,944 | 8/1966 | Watson | 244/3.18 |
| 3,286,953 | 11/1966 | Dryden | 244/15 A |
| 3,310,876 | 3/1967 | Yamron | 235/150.25 X |
| 3,310,982 | 3/1967 | Yamron | 235/150.25 X |
| 3,346,966 | 10/1967 | Gates | 235/150.25 |
| 3,439,884 | 4/1969 | Slater | 244/15 A |

Primary Examiner—Trygve M. Blix
Assistant Examiner—Barry L. Kelmachter
Attorney, Agent, or Firm—Darrell G. Brekke; John R. Manning

[57] ABSTRACT

In a strapped-down gyroscope space vehicle attitude control system, a method and apparatus are provided for gyro drift and input axis misalignment error compensation employing a sun and a star tracker and preselected vehicle calibration maneuvers. During the preselected maneuvers using the sun and a star as external references, the outputs of two-axis strapped-down gyroscopes nominally aligned with the optical axis of the sun and star trackers are measured. The measured outputs provide gyro drift calibration, roll, pitch and yaw axis scale factors and values corresponding to the degree of nonorthogonality between the roll axis and the pitch and yaw gyro input axes and the nonorthogonality of the roll and pitch axes relative to the yaw axis. With the calibration data so obtained stored in a special purpose digital computer, the vehicle is then rolled and yawed through precomputed angles as modified by the calibration data to acquire a target without further recourse to external references.

20 Claims, 4 Drawing Figures

FIG. 2B

ALL SKY POINTING ATTITUDE CONTROL SYSTEM

ORIGIN

The invention described herein was made by employees of the United States Government and may be manufactured and used by or for the Government for governmental purposes without the payment of any royalties thereon or therefor.

BACKGROUND OF THE INVENTION

The present invention relates to space vehicle attitude control systems for precisely pointing the sensitive axis of scientific instruments at any arbitrary target in space in general and, in particular, to an attitude control system employing strapped-down gyroscopes, a sun and star tracker, and a method and error correction apparatus for compensating for gyro drift, integrator drift, scale factor error, gyro input axis triad non-orthogonality and gyro input and axis-optical axis misalignment.

A number of systems have been employed in the past to perform this function. They are of three basic types using either star-trackers to identify and lock-on to known stars at or near a target, gyroscopes with (or without) accelerometers on a stabilized platform to provide an inertial reference from which the target may be located, or a combination of gyroscopes and star-trackers wherein the gyros stabilize the vehicle and provide coarse pointing guidance while the star-tracker holds the vehicle on target. A programmable (general purpose) digital computer is usually required for the first two types of these systems.

The prior known systems, however, suffer from either being overly complex (hence, expensive and unreliable) or lacking the accuracy and precision demanded by experimenters, or both.

SUMMARY OF THE INVENTION

In view of the foregoing, a principal object of the present invention is an attitude control system employing two-axis rate gyroscopes, a sun-tracker, a star-tracker, control electronics and a small, special purpose digital computer which is characterized by simplicity of mechanization, higher reliability, lower cost, improved performance and versatility.

The gyroscopes are fixed ("strapped-down") to the vehicle with their input axes nominally aligned with the sun and star-tracker optical axes. The vehicle, using the sun and a star, such as Canopus, as a reference, is caused to execute a series of calibration maneuvers (rolling, then yawing through 360°) which involves combining optical and gyro outputs to minimize the effects on pointing accuracy of the previously described error sources.

Upon solar acquisition after launch vehicle ejection, the instrument vehicle is rolled around the sun line to acquire Canopus. While the vehicle maintains the sun-star reference, gyro and integrator drift calibration figures are obtained and stored. Thereafter, the vehicle is caused to execute a series of roll and yaw maneuvers during which roll and yaw gyro output values are compared with the true roll and yaw angles and values corresponding to the degree of nonorthogonality between the roll axis and the pitch and yaw gyro input axes and the nonorthogonality of the roll and pitch axes relative to the yaw axis is determined. These values are stored and, together with the roll and yaw gyro output values, used to modify the outputs of the gyroscopes for subsequent acquisition of any arbitrary target independent of external references.

DESCRIPTION OF THE DRAWINGS

The above and other objects, features and advantages of the invention will be apparent in the following detailed description of the accompanying drawings in which.

DETAILED DESCRIPTION

Figure 1:
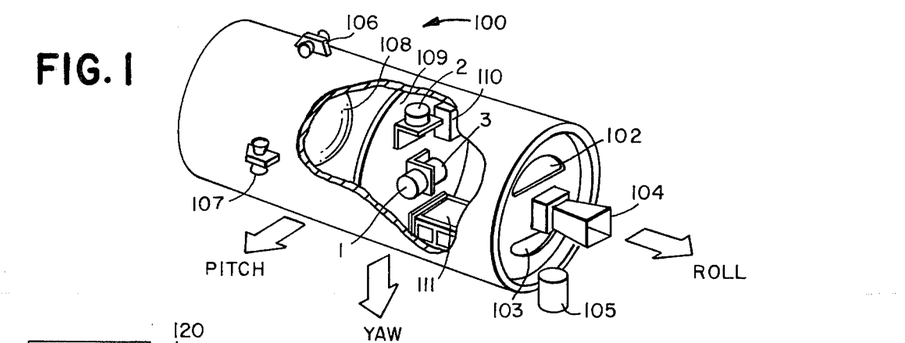
FIG. 1 is a partially broken away perspective view of an instrument vehicle incorporating the attitude control system of the present invention.

Referring to FIG. 1, there is illustrated, in accordance with the present invention, an instrument-bearing space vehicle 100 having three axes represented by arrows designated roll, pitch and yaw. Vehicle 100 is provided at one end with a pair of experiment-viewing ports 102, 103 for use by optical instruments (not shown) mounted in the interior of the vehicle. It is to be understood, however, that any number of viewing ports may be used and that the location of the ports in the walls of the vehicle depends entirely on the vehicle instrumentation and the nature of the experiments to be performed and that other types of instruments requiring vehicle attitude control may be included in the vehicle instrumentation.

Coaxial with the roll axis and intermediate ports 103 and 102, there is provided a conventional sun-sensor 104. A conventional star-tracker 105 is positioned adjacent sensor 104. Star-tracker 105 is preferably, though not necessarily, orientated to have its optical null axis substantially normal to the optical null axis of the sun-sensor for providing maximum angular resolution. Considering the sun-sensor 104 and star-tracker 105 to be mounted on the front end of the vehicle and aligned with respect to a first set of orthogonal coordinates, there is provided aft of the front end and projecting from the wall of vehicle 100, a plurality of cold gas control jets 106 and 107. Jets 106 and 107 and others (not shown) are used to maneuver the vehicle 100 through selected roll, pitch and yaw attitude changes as hereinafter described.

Interior of vehicle 100, there is provided at its aft end a control jet gas tank 108 for use by jets 106 and 107. Forward of tank 108 and mounted to a bulkhead 109, there is provided three two-axis strapped-down gyroscopes 1, 2 and 3. Gyroscopes 1, 2 and 3 are, respectively, the roll, pitch and yaw gyros of the attitude control system of the present invention. The gyroscopes are fixed (strapped-down) to the vehicle with their input axes aligned with respect to a second set of orthogonal coordinates though nominally in alignment with the sun and star-tracker optical axes. Also mounted to bulkhead 109 are a control electronics module 110 and a small, special purpose digital computer 111.

The gyros 1, 2 and 3 sense angular motion of vehicle 100 and output signal information to the control electronics module 110 and computer 111 which processes the signal information for positioning the vehicle.

Figure 2:
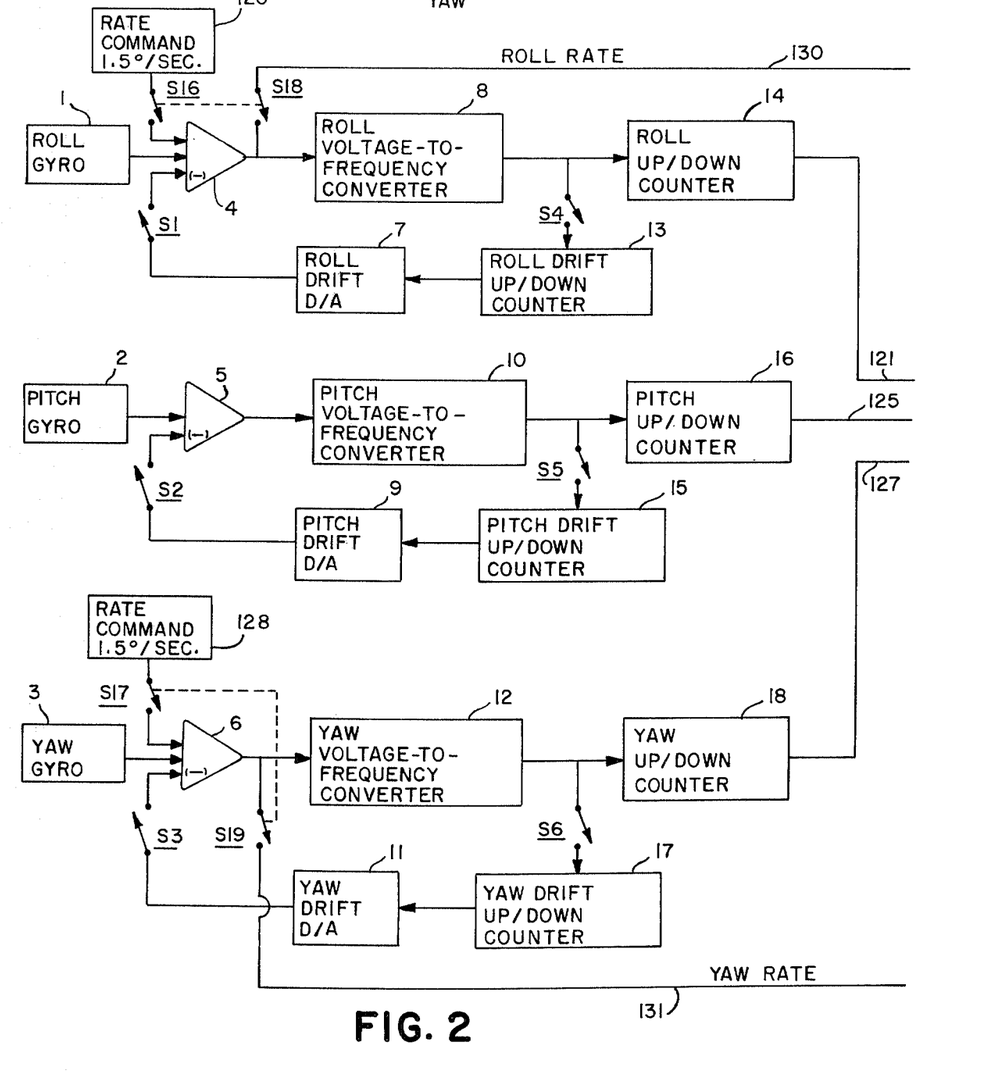
FIGS. 2, 2A and 2B comprise a block diagram of the control electronics and computer of the system of FIG. 1.
Figure 2A:
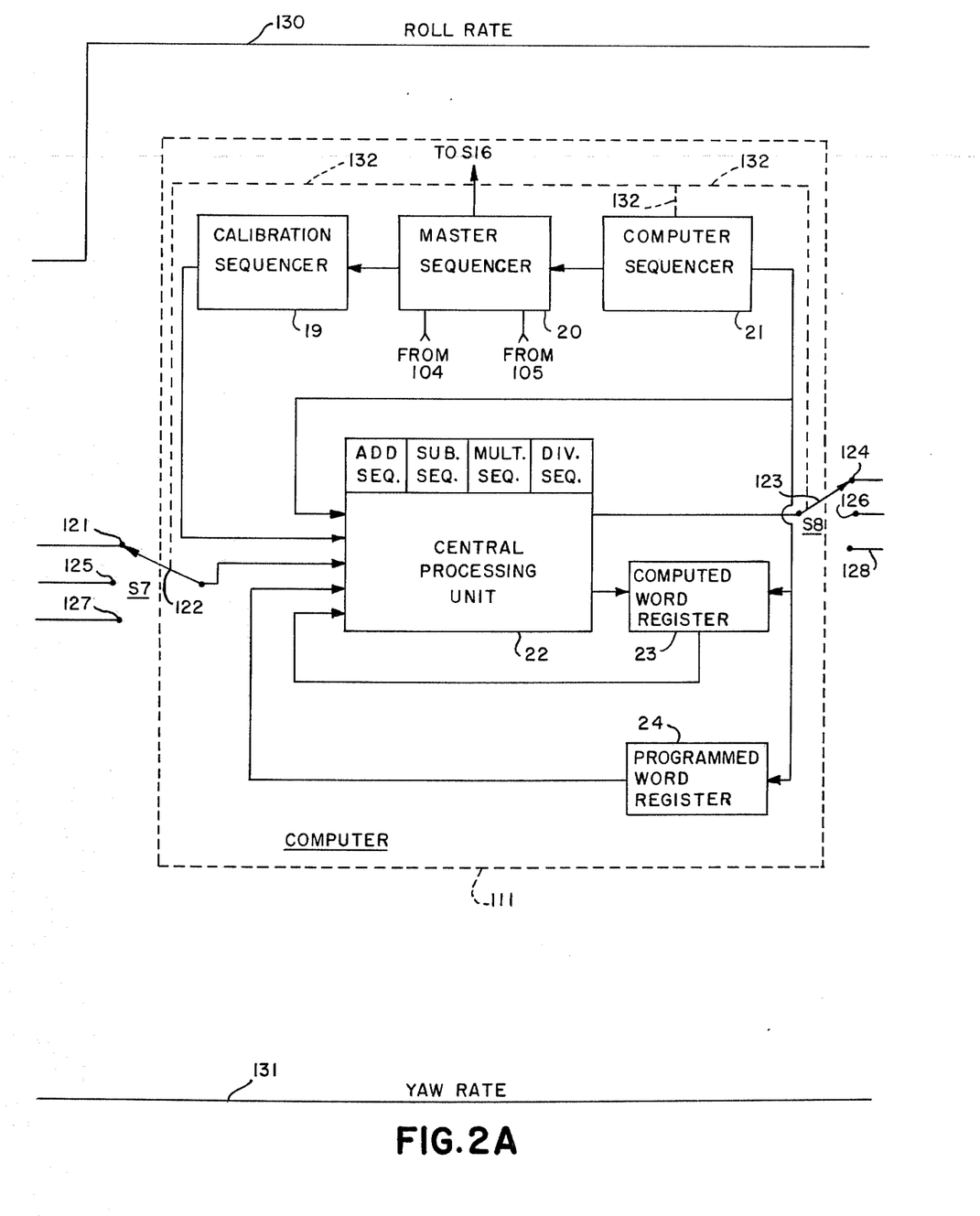
Figure 2B:
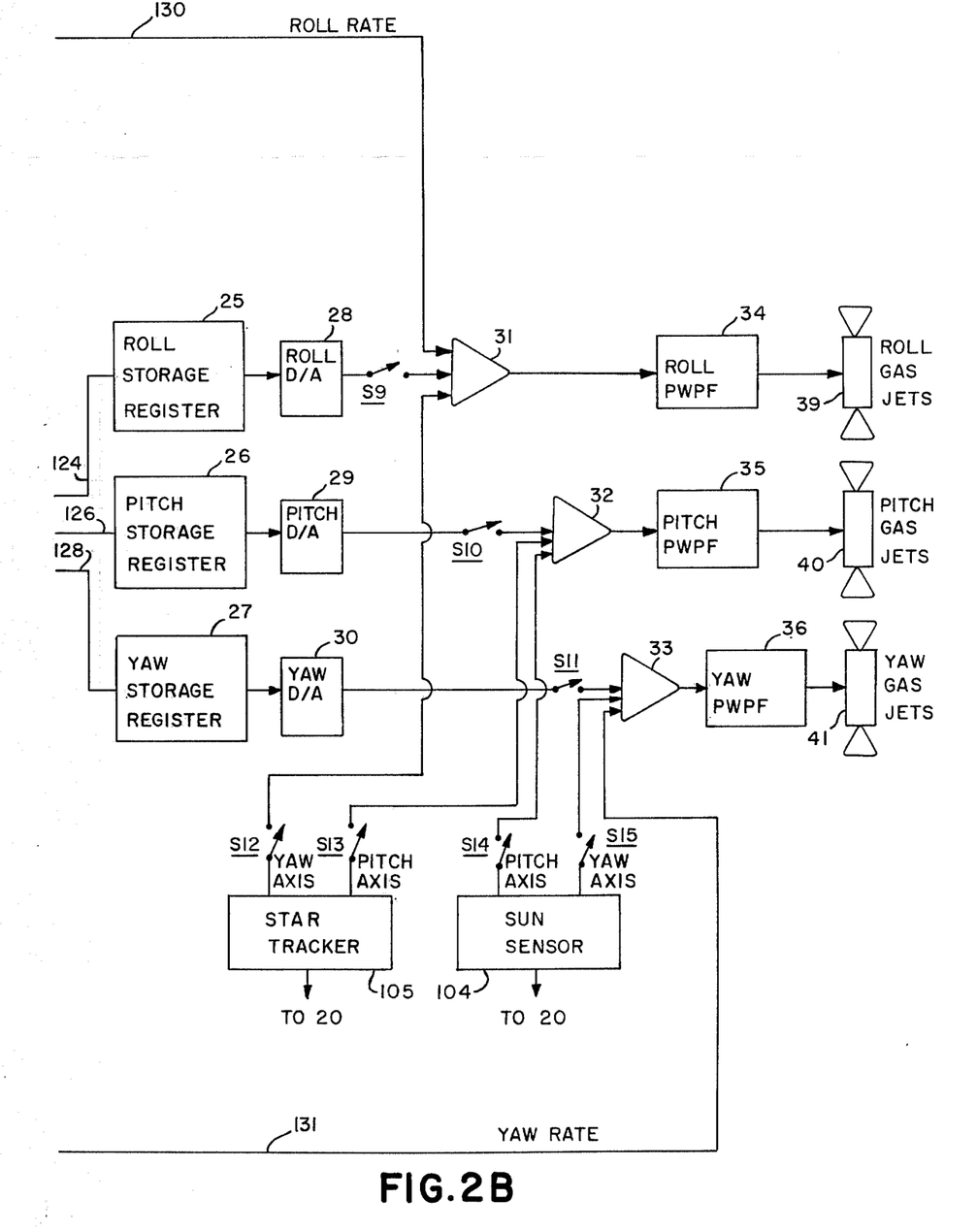

Referring to FIG. 2, gyros 1, 2 and 3, control electronics module 110 and computer 111 comprise a roll, a pitch and a yaw channel.

In the roll channel there is provided roll gyro 1. The output of roll gyro 1 is coupled to an input of a three input summing amplifier 4. The output of amplifier 4 is coupled to a roll voltage-to-frequency converter 8 and, by means of a switch S18 and a line 130, to an input of a three input amplifier 31. The output of converter 8 is coupled to a roll up/down counter 14 and through a switch S14 to a roll drift up/down counter 13. The output of converter 13 is coupled to a roll drift digital-to-analog converter 7. The output of converter 7 is coupled to a second one of the inputs of amplifier 4 through a switch S1. Coupled to a third of the inputs of amplifier 4 via a switch S16 is a rate command module 120. Switches S16 and S18 are mechanically coupled. When switches S16 and S18 are closed, module 120 will output a signal which commands a roll rate of 1.5 degrees/second. The output of counter 14 is coupled to a contact 121 of a single pole, three position switch S7 having a selector 122 which is coupled to a central processing unit (CPU) 22 in computer 111.

Processed control signals from CPU 22 of computer 111 are fed into the roll channel via selector 123 of a single pole, three position switch S8. The input of a roll storage register 25 is coupled to a contact 124 of switch S8. The output of register 25 is coupled to a second input of amplifier 31 through a roll digital-to-analog converter 28 and a switch S9. The output of amplifier 31 is coupled to a roll gas jet 39 through a pulse width pulse frequency valve modulator 34. Jet 39 corresponds to one of jets 106 and 107 in FIG. 1.

The pitch channel comprises the pitch gyro 2. The output of gyro 2 is coupled to a two-input summing amplifier 5. The output of amplifier 5 is coupled to a pitch voltage-to-frequency converter 10. The output of converter 10 is coupled to a pitch up/down counter 16 and through a switch S5 to a pitch drift up/down counter 15. Counter 15 is coupled to the second input of amplifier 5 through a switch S2 and a pitch drift digital-to-analog converter 9. For providing signal information to computer 111, the output of counter 16 is coupled to CPU 22 through a contact 125 of switch S7.

Pitch control signals processed by computer 111 are fed into the pitch channel to a pitch storage register 26 coupled to CPU 22 by way of a contact 126 in switch S8. The output of register 26 is coupled to a pitch digital-to-analog converter 29. The output of converter 29 is coupled to a second input of the three-input amplifier 32 by means of a switch S10. The output of amplifier 32 is coupled to a pitch gas jet 40 through a pitch pulse width pulse frequency valve modulator 35. Jet 40 corresponds to one of the jets 106 and 107 shown in FIG. 1.

The yaw channel comprises the yaw gyro 3. Gyro 3 is coupled to an input of a three-input summing amplifier 6. The output of amplifier 6 is coupled to a yaw voltage-to-frequency converter 12 and, by means of a switch S19 and a line 131, to an input of a three-input amplifier 33. The output of converter 12 is coupled to a yaw up/down counter 18 and through a switch S6 to a yaw drift up/down counter 17. The output of counter 17 is coupled to a second input of amplifier 6 via a yaw drift digital-to-analog converter 11 and a switch S3. Converter 18 furnishes signal information to CPU 22 in computer 111 via a contact 127 in switch S7.

Control signals processed by CPU 22 are fed to the yaw channel via a contact 128 in switch S8 coupled to the input of a yaw storage register 27. The output of register 27 is coupled to a yaw digital-to-analog converter 30. The output of converter 30 is coupled to a third input of three-input amplifier 33 through a switch S11. Signals from amplifier 33 are coupled to a yaw gas jet 41 through a yaw pulse width pulse frequency modulator 36. As in the roll channel, there is further provided a yaw rate command module 128 coupled to amplifier 6 through a switch S17. Switches S17 and S19 are mechanically coupled. When switches S17 and S19 are closed, the vehicle is yawed at a rate of 1.5 degrees/second.

Sun-sensor 104 and star-tracker 105 are also coupled to amplifiers 31, 32 and 33 for providing vehicle roll, pitch and yaw stabilization signals to jets 39, 40 and 41 in response to internally conventionally generated pitch and yaw optical error signals. The yaw axis output of star-tracker 105 is coupled to an input of amplifier 31 in the roll channel via a switch S12 and its pitch axis output is coupled to an input of amplifier 32 in the pitch channel via a switch S13. A pitch axis output of sun-sensor 104 is coupled to an input of amplifier 32 through a switch S14, and a yaw axis output of sun-sensor 104 is coupled to an input of amplifier 33 in the pitch channel via a switch S11.

Computer 111, which receives input control signals from the roll, pitch and yaw channels through switch S7 and provides processed control signals to the roll, pitch and yaw channels via switch S8, comprises, in addition to the conventional CPU 22, which includes means for addition, subtraction, multiplication and division, a calibration sequencer 19, a master sequencer 20, a computer sequencer 21, a computed word register 23 and a programmed word register 24. Master sequencer 20 is coupled to intermediate calibration and computer sequencers 19 and 21 and to sun-sensor 104 and star-tracker 105 and serves to control the operation of the calibration and computer sequencers 19 and 21 and the switching of switches S1-S6 and S9-S15 in response to yaw and pitch axis error signals from sun-sensor 104 and star-tracker 105. Computer sequencer 21 is mechanically coupled, as illustrated by a dashed line 132, to switches S7 and S8 and serves to sequence switches S7 and S8 in response to the master sequencer 20 coupled to its input. An output of computer sequencer 21 is also coupled to CPU 22, computed word register 23 and programmed word register 24. An output of registers 23 and 24 is coupled to the CPU 22 as is the output of calibration sequencer 19. An ouput of the CPU 22 is also coupled to an input of the computed word register 23.

The details of the construction and operation of the star-tracker 105 and sun-sensor 104 are omitted, as both are conventional apparatus. Similarly the details of calibration sequencer 19, master sequencer 20, computer sequencer 21 and CPU 22 are omitted as each employs only typical computer logic and switching networks in a conventional manner to control and execute the functional operations of the system as hereinafter described.

The operation of the all sky pointing attitude control system of the present invention comprises six modes of operation which commence upon ejection of the instrument vehicle 100 from a space-shuttle or other launch vehicle.

In Mode 1, Sun Orientation, the control system utilizes a standard solar pointing Aerobee rocket control system, the details of which are therefore omitted, to locate the sun and align the vehicle roll axis (as defined by the optical null axis of the sun-sensor 104) within 50 arc-seconds of the radiometric center of the sun. When the sun-sensor 104 indicates to the master sequencer 20 in a conventional manner that the pitch and yaw signals are less than 50 arc-seconds for a period of 10 seconds, switches S14 and S15 are closed to provide yaw and pitch stabilization, and Mode 2 is commenced.

In Mode 2, Stellar Acquisition, a predetermined star, preferably as close to ninety degrees from the sun as possible, such as Canopus, is acquired. The master sequencer 20 closes switches S16 and S18 at the output of the rate command module 120 in the roll channel to command the vehicle 100 to roll about the vehicle-sun line established during Mode 1 at 1.5 degrees/second. During this roll maneuver, with switches S14 and S15 closed, the sun-sensor 104 provides pitch and yaw stabilization while the yaw axis output of the star-tracker is monitored by the master sequencer 20. The roll maneuver is continued until the star-tracker, set to detect a preselected star, such as Canopus, indicates a yaw error of 7200 arc-seconds (2 degrees). The master sequencer 20 then opens switches S16 and S18 and closes switch S12 at the output of the star-tracker so that an error signal proportional to the angle between the star-tracker optical null axis and the vehicle-star line is generated. The vehicle thus becomes locked-on to both the sun and the star and now has an inertial reference. When the yaw error signal from the star-tracker and the yaw and pitch error signals from the sun-sensor have been less than 50 arc-seconds for a period of 10 seconds, Mode 3 is commenced.

In Mode 3, Gyro Drift Calibration, gyro drift is observed for a predetermined interval while sun and star pointing attitudes, established in Modes 1 and 2, are maintained utilizing them as optical references. The master sequencer closes switches S4, S5 and S6 so that the pulses coming from the voltage-to-frequency converters 8, 9 and 10 will be counted by the roll, pitch and yaw drift up/down counters 13, 15 and 17 for a predetermined interval, such as, for example, 40 seconds. In this way, the net drift of the roll, pitch and yaw gyros 1, 2 and 3 over said specified period of time will be converted from a slowly fluctuating voltage at the summing amplifiers 4, 5 and 6 to digital numbers stored in binary code in the drift up/down counters 13, 15 and 17. At the end of the predetermined interval, the master sequencer opens switches S4, S5 and S6 and closes switches S1, S2 and S3. Upon closure of switches S1, S2 and S3, which couple digital-to-analog converters 7, 9 and 11 to summing amplifiers 4, 5 and 6, respectively, the three drift values stored in counters 13, 15 and 17 are converted to appropriately scaled analog voltages and substracted from the gyro outputs at the summing amplifiers. If, at this time, the optical error signals in all three axes have remained less than 50 arc-seconds for at least 10 seconds, Mode 4 will also be initiated.

In Mode 4, Roll Axis Calibration, a roll axis scale factor is generated and an orthogonality calibration value determined. Switches S16 and S18 are closed by the master sequencer causing the vehicle to roll about the vehicle-sun line established during Mode 1 at 1.5 degrees/second until the star-tracker yaw error signal is less than 7200 arc-seconds with respect to the selected star Canopus as in Mode 2. When the desired yaw error signal is achieved, switch S12 is closed and switches S16 and S18 are opened to allow the vehicle to stabilize using the star image as a reference.

In contrast to the system operation in Mode 2, however, the star-tracker yaw error signal is not monitored by the master sequencer until 10 seconds after start of the roll maneuver. This precludes locking-on to the star without a full revolution of the vehicle.

During the roll calibration maneuver, the roll gyro output is compared with the true roll angle (360°) measured by sensing Canopus. Simultaneously, the pitch and yaw gyro outputs are measured to determine the values corresponding to the degree of nonorthogonality between the roll axis and the pitch and yaw gyro input axes.

To perform the necessary computations, the computer sequencer 21 sequences switch S7 whereby the central processing unit (CPU) 22 sequentially samples the output of the roll, pitch and yaw up/down counters 14, 16 and 18. The calibration sequencer 19 in response to the master sequencer directs the CPU 22 to process the data to provide roll scale factor, roll-into-pitch and roll-into-yaw cross coupling factors and store these numbers in the computed word register 23 for later use. Provided that all optical error signals have remained below 50 arc-seconds for a ten-second interval, the master sequencer 20 commences Mode 5 operation at the completion of the Mode 4 computations.

In Mode 5, Yaw Axis Calibration, the vehicle is yawed 360° and reacquires the sun and Canopus in a manner similar to Modes 1 and 2. Calculations identical to those of Mode 4 are made for yaw axis scale factor error and nonorthogonality of the roll and pitch axes relative to the yaw axis.

In order to revolve about the yaw axis and still retain optical pitch and roll attitude information, the vehicle is maneuvered about its pitch axis until the star-tracker pitch error signal is zeroed. This is accomplished by the master sequencer 20 when the master sequencer 20 closes switch S13 and opens switch S14 on the output of the sun and star-tracker 104 and 105, respectively. After 10 seconds, if the star-tracker 105 pitch error signal remains below 50 arc-seconds, the master sequencer 20 opens switch S15 and closes switches S17 and S19 to command the vehicle to yaw about the vehicle-star line at a rate of 1.5 degrees/second. In a manner identical to that in Mode 4, but using the sun-sensor 104, the vehicle 100 monitors the sun-sensor 105 yaw error signal (and binary sun presence indication, as in all sun acquisition maneuvers), and opens switches S17 and S19 and closes switch S15 to reacquire the sun when they yaw error signal from the sun-sensor 104 drops below 7200 arc-seconds. When 10 seconds of less than 50 arc-seconds of optical error on all three axes have elapsed, the original state of the pitch orientation at the beginning of Mode 5 is re-established by a closure of switch S14 and an opening of switch S13 on the outputs of the sun and star-tracker 104 and 105, respectively, under the control of master sequencer 20.

When the vehicle has returned to the orientation it had at the beginning of Mode 5 and the optical error signals in all three axes have remained less than 50 arc-seconds for at least 10 seconds, the master sequencer 20 activates the computer and calibration sequencers 20 and 19, respectively. As in Mode 4, but with respect to yaw, the computer sequencer 21 sequences switch S7 to sample the contents of the roll, pitch and yaw up/down counters 14, 16 and 18, while the calibration sequencer 19 controls the computation in the CPU 22 of the yaw scale factor, yaw-into-pitch and yaw-into-roll cross coupling factors and stores these factors in the computed word register 23. Upon completion of the Mode 5 computations, Mode 6 is initiated.

Mode 6, Target Acquisition, is in two parts: a roll maneuver, Modes 6-1, and a yaw maneuver, Mode 6-2.

In Mode 6-1, Target Acquisition Roll Maneuver, the master sequencer 20 closes switch S16 and opens switch S12 to command the vehicle 100 to roll at a rate of 1.5 degrees/second through a target angle calculated from a predetermined roll target angle prestored in the programmed word register 24. During the roll maneuver with switches S14 and S15 closed, the pitch and yaw axes are stabilized by signals from the sun-sensor 104. The computer sequencer 21 sequences switch S7 to sample the data in the roll up/down counter 14 and controls the computation of a corrected roll signal and the derivation of a roll position error signal. The corrected roll signal is derived by multiplying the roll scale factor stored in the computed word register 23 in Mode 4 by the number, at each sample, in the roll up/down counter 14. The derivation of the roll position error signal, a function of the roll gyro output, is obtained by subtracting the corrected roll signal (a digital number) from the predetermined roll target angle (another digital number) prestored in the programmed word register 24. When the roll position error signal is less than 7200 arc-seconds, the master sequencer 20 opens switch S16 and S18 and closes switch S9 at the output of the roll digital-to-analog converter 28. The roll position error signal is transferred from the CPU 22 to the roll storage register 25. The roll digital-to-analog converter 28 converts the contents of the roll storage register 25 to an analog voltage and applies the analog voltage to the input of the roll pulse width pulse frequency value modulator 34 through the amplifier 31 which drives the roll gas jets 39 to roll the vehicle through the computed roll target angle.

During Mode 6-1, the CPU 22 computes roll-into-yaw and roll-into-pitch correction factors which are arrived at by multiplying the corrected roll signal by the roll-into-yaw and roll-into-pitch cross coupling factors computed during Mode 4 for each sampling of the contents of the roll up/down counter 14. When the optical error signals in all three axes have remained less than 50 arc-seconds for at least a ten-second duration, the master sequencer 20 resets the yaw and pitch up/down counters 16 and 18 with the negative of the most recent value of the appropriate cross coupling correction factor. This insures that the pitch and yaw axes have the correct initial conditions at the start of the yaw target acquisition maneuver.

In Mode 6-2, Target Acquisition yaw Maneuver, at the completion of the loading of the pitch and yaw up/down counters 16 and 18, the master sequencer 20 closes switches S17 and S19, and switch S10, and opens switch S14 and switch S15. The vehicle 100 is then completely stabilized by reference to the three rate gyros, and is rotating about its yaw axis at 1.5 degrees/second.

During Mode 6-2, the computer sequencer 21 is cycling switch S7 and switch S8 synchronously so that the roll, pitch and yaw data is obtained from, computed for, and directed to each axis sequentially. Corrected error signals for the Mode 6-2 maneuver are computed in a series of steps as follows:

a. The four cross-coupling correction factors, roll-into-yaw, roll-into-pitch, yaw-into-roll and yaw-into-pitch, are obtained by multiplying the most recent value of the corrected yaw and roll angles (digital numbers) by the appropriate previously computed cross coupling factors stored during Modes 4 and 5.

b. An intermediate value of corrected pitch, yaw and roll angles is found by substracting the cross coupling correction factor determined in the previous step from the contents of the up/down counter corresponding to a particular axis — i.e., an intermediate pitch number would be obtained by subtracting the yaw-into-pitch and roll-into-pitch cross coupling correction factors from the number found in the pitch up/down counter.

c. New corrected roll and yaw angles are determined by multiplying the intermediate value found in the previous step by the respective scale factor determined and stored during Modes 4 and 5.

d. Roll and yaw error signals are produced by subtracting the corrected roll and yaw angles from the numbers prestored in the programmed word register 24.

Since the pitch axis always remains at a null, there is no necessity to compute cross coupling correction factors such as pitch-into-roll, or multiply the intermediate value of the corrected pitch angle by a scale factor. The error signal transferred to the pitch storage register 26 is the intermediate pitch angle number computed above.

The yawing motion is braked when the yaw error signal drops below 7200 arc-seconds.

When this occurs, the master sequencer 20 monitoring the yaw error signal opens switches S17 and S19 and closes switch S11 to allow the yaw angle to be driven to the preselected value. Mode 6-2 is terminated when the error signals in all three axes remains below 50 arc-seconds for a ten-second period. The master sequencer may be programmed to hold at the target for any desired length of time, recycled through the six modes, or move to a new target by utilizing a new set of programmed roll and yaw members.

What is claimed is:

1. In a space vehicle, an attitude control system comprising:

a sunsensor and a startracker, each having an optical axis, said axes being orthogonally disposed and forming a first set of orthogonal coordinates;

a plurality of strapped-down gyroscopes, each having an input axis, said axes being orthogonally disposed and forming a second set of orthogonal coordinates;

a first means responsive to an output of said gyroscopes for determining the drift of each of said gyroscopes;

a second means for determining the degree of misalignment between said first and said second set of orthogonal coordinates; and a means responsive to said first and said second means for pointing said vehicle at a predetermined target.

2. In a space vehicle having a roll, pitch and yaw axis, an attitude control system comprising:

a plurality of strapped-down gyroscopes, said gyroscopes being fixed to said vehicle with at least two input axes nominally orientated orthogonally and nominally aligned with at least two of said vehicle axes;

a first means for determining the drift of each of said gyroscopes;

a second means for determining the degree of nonorthogonality between said gyroscope input axes;

a third means for determining the degree of misalignment between said gyroscope input axes and said vehicle axes; and a fourth means responsive to said second and said third means for pointing said vehicle at a preselected target.

3. An attitude control system according to claim 2 wherein said second and said third means comprise:

a computing means, said computing means including a data storage means for storing data corresponding to a set of coordinates of a preselected target;

a means for sampling the output signals of said gyroscopes during preselected attitude changes of said vehicle; and a means responsive to said sampling means and said preselected target coordinates for generating vehicle roll, pitch and yaw attitude control signals.

4. An attitude control system according to claim 3 wherein said means responsive to said second and said third means for pointing said vehicle at a preselected target comprises data storage means for receiving said vehicle attitude control data and gas jet positioners coupled thereto.

5. In a space vehicle having a roll, a pitch and a yaw axis, an attitude control system comprising:

a plurality of strapped-down gyroscopes, and gyroscopes being fixed to said vehicle with at least two nominally orthogonal input axes nominally aligned with at least two of said vehicle axes;

a means for measuring the drift of said gyroscopes, the degree of nonorthogonality between said gyroscope input axes, and the degree of misalignment between said gyroscope input axes and said vehicle axes;

a means responsive to said measuring means for generating compensating attitude control signals as a function of said drift, said nonorthogonality and said misalignment; and means responsive to said generating means for pointing said vehicle at a preselected target.

6. A system according to claim 5 wherein said measuring means comprises:

a means for positioning and maintaining said vehicle in a predetermined attitude for a predetermined interval of time;

means for rolling said vehicle through a predetermined angle; and means for yawing said vehicle through a predetermined angle.

7. A system according to claim 6 wherein said positioning and maintaining means, said rolling means and said yawing means comprise a sun-sensor and a star-tracker, said sun-sensor including means for establishing a vehicle-sum reference line and said star-tracker serving to establish a vehicle-star reference line.

8. A system according to claim 7 wherein said rolling means includes means for selectively rolling said vehicle about said vehicle-sun reference line until said star-tracker reacquires a previously acquired predetermined star.

9. A system according to claim 7 wherein said yawing means comprises:

a means for selectively causing said vehicle to execute a pitching maneuver about its pitch axis until an error signal from said star-tracker is nulled;

a means responsive to said error signal for selectively yawing said vehicle about said vehicle-star reference line until said sun-sensor reacquires the sun; and a means for returning said vehicle to its attitude prior to said pitching maneuver.

10. In a space vehicle carrying scientific instruments, including a sun sensor and a star tracker with their respective optical axes aligned with respect to a first set of orthogonal coordinates and a plurality of strapped-down gyroscopes with their respective input axes aligned with respect to a second set of nominally orthogonal coordinates, an attitude system comprising:

first means for measuring the drift of each of said gyroscopes;

a second means for measuring the degree of misalignment between said first and second set of orthogonal coordinates;

a third means for measuring the degree of nonorthogonality between the axes of said second set of nominally orthogonal coordinates; and a means responsive to said first, and second, and said third means for providing compensated signals corresponding to said drift, misalignment and said nonorthogonality for maneuvering said vehicle to point said scientific instruments at a predetermined target.

11. An attitude control system according to claim 10 wherein said first means for measuring drift of each of said gyroscopes includes a means for positioning and maintaining said vehicle in a predetermined attitude for a predetermined period of time and said second means for measuring a misalignment between said first and said second set of orthogonal coordinates and said third means for measuring said nonorthogonality between axes of the second set of nominally orthogonal coordinates include means for selectively maneuvering said vehicle through preselected attitude changes.

12. An attitude control system according to claim 11 wherein said means for selectively maneuvering said vehicle through preselected attitude changes comprises a means for rolling said vehicle about its roll axis through a preselected angle while maintaining said vehicle in a predetermined pitch and yaw attitude and a means for yawing said vehicle about its yaw axis through a preselected angle while maintaining said vehicle in a predetermined roll and pitch attitude.

13. An attitude control system according to claim 12 wherein said plurality of gyroscopes comprise a roll, a pitch and a yaw gyroscope and said second means for measuring said nonorthogonality includes a means for measuring the pitch and yaw gyroscope outputs with respect to said roll attitude change and means for interpreting said outputs as the degree of nonorthogonality between the roll axis of said vehicle and the pitch and yaw input axes of said gyroscopes when said vehicle is rolled through said preselected angle; and a means for measuring the pitch and roll gyroscope output with respect to said yaw attitude change and means for interpreting said outputs as the degree of nonorthogonality between the yaw axis of said vehicle and the roll and pitch input axes of said gyroscopes when said vehicle is yawed through said preselected angle.

14. An attitude control system according to claim 13 further comprising a sun-tracker and a star-tracker and wherein said means for positioning and maintaining said vehicle in said first predetermined attitude comprises a means using said suntracker to acquire the sun for establishing a sun reference line and a means using said star-tracker for rolling said vehicle about said sun reference line to acquire a predetermined star for establishing a star reference line.

15. An attitude control system to claim 14 wherein said means for changing said roll attitude through a preselected angle comprises means for rolling said vehicle about said sun reference line through an angle of 360° and reacquiring said predetermined star on completion of said roll attitude change and said means for changing the yaw attitude of said vehicle through said preselected angle comprises means for yawing said vehicle through 360° and reacquiring said sun and said predetermined star on completion of said yaw attitude change.

16. An attitude control system according to claim 10 wherein each of said plurality of strapped-down gyroscopes includes an input axis and said vehicle aligning means includes a sun sensor and a star tracker each including an optical axis, said input axes of said gyroscopes being nominally aligned with corresponding axes of said sun sensor and star tracker, and further comprising a means for selectively rolling and yawing said vehicle through predetermined angles for computing and storing a plurality of values corresponding to gyro roll and yaw scaling factors between said gyroscope input axes and said sun sensor and star tracker optical axes and a plurality of values corresponding to roll-into-pitch, roll-into-yaw, yaw-into-pitch, and yaw-into-roll cross coupling factors.

17. In a space vehicle, an attitude control system comprising:
a sun-sensor;
a star-tracker;
a plurality of strapped-down gyroscopes with their respective roll, pitch, and yaw input axes nominally aligned with the corresponding optical axes of said sun-sensor and said star-tracker;
a first means for measuring the drift of said gyroscopes over a predetermined time interval;
a second means for measuring the degree of misalignment between said input axes of said gyroscopes and said corresponding optical axes of said sun-sensor and said star-tracker for providing error signals to compensate for said drift and said misalignment; and
a third means responsive to said first and said second means for calculating corrected target angles for maneuvering said vehicle to a predetermined attitude with respect to a preselected target.

18. In a space vehicle, an attitude control system comprising:
a means having a first and a second optical axis for aligning said vehicle with respect to the sun and a predetermined star;
a means for maintaining said vehicle in a predetermined attitude with respect to said sun and said star for a predetermined interval of time;
a plurality of strapped-down gyroscopes having their respective input axes nominally aligned with said first and said second optical axes;
a means for measuring and storing a value corresponding to the drift of said gyroscopes during said predetermined interval of time;
a means responsive to said drift value for providing a gyro output signal compensated by said drift value; and
a means for selectively rolling and yawing said vehicle through a preselected angle about its roll and yaw axes for generating a gyro roll and yaw scale factor, a value corresponding to the degree of nonorthogonality between the roll axis of said vehicle and the pitch and yaw gyro input axes of said gyroscopes and a value corresponding to the degree of nonorthogonality between the yaw axis of said vehicle and the roll and pitch input axes of said gyroscopes.

19. In a space vehicle, an attitude control system comprising:
a plurality of strapped-down gyroscopes;
a means for aligning said vehicle with respect to the sun and a predetermined star thereby establishing a vehicle-sun reference line and a vehicle-star reference line;
a means for maintaining said vehicle in a predetermined attitude with respect to said sun and said star for a predetermined interval of time;
a means for measuring the output of said gyroscopes over said predetermined interval of time for generating a gyro drift error signal for each of said gyroscopes;
a means responsive to the output of said gyroscopes and said measuring means for generating a drift compensated output signal from each of said gyroscopes;
said drift error signal and said drift compensated output signal generating means comprising:
a summing amplifier coupled to the output of each of said gyroscopes,
a voltage-to-frequency converter coupled to the output of said summing amplifier,
a drift up/down counter,
a drift digital-to-analog converter coupled to the output of said drift up/down counter,
switch means for selectively coupling said drift up/down counter to said voltage-to-frequency counter, and
switch means for selectively coupling said drift digital-to-analog counter to an input of said summing amplifier.

20. A method of acquiring a preselected target including compensating for gyro drift, gyro input axes nonorthogonality and gyro input axes-vehicle roll, pitch and yaw axis misalignment in a space vehicle attitude control system using a plurality of strapped-down gyros comprising the steps of:
maintaining said vehicle in a predetermined attitude for a predetermined time interval;
monitoring the outputs of said gyros and storing a value corresponding to the drift of each of said gyros during said time interval for use in providing drift compensated gyro output signals during subsequent vehicle attitude changes in a first subsequent time interval;
selectively rolling and yawing said vehicle through preselected angles in said first subsequent time interval;
selectively monitoring said drift compensated gyro output signals during said rolling and said yawing in said first subsequent time interval;
computing and storing roll and yaw scale factors, roll-into-pitch, roll-into-yaw, yaw-into-pitch and yaw-into roll cross coupling factors as a function of said drift compensated gyro output signals and said preselected angles;

selectively rolling and yawing said vehicle in a second subsequent time interval;

selectively monitoring said drift compensated gyro output signals during said rolling and yawing in said second subsequent time interval;

computing and storing a roll, pitch and yaw error position signal as a function of a prestored target angle, said drift compensated gyro output signals, said scale, factors and said cross coupling factors; and driving said vehicle through an attitude change corresponding to the magnitude of said roll, pitch and yaw error position signals.

* * * * *